United States Patent [19]
Yamada et al.

[11] Patent Number: 5,903,697
[45] Date of Patent: May 11, 1999

[54] OPTICAL WAVEGUIDE, METHOD OF MAKING THE SAME AND INTEGRATED OPTICAL DEVICE

[75] Inventors: Yasufumi Yamada; Masahiro Yanagisawa; Hiroaki Okano; Keiichi Higuchi; Hisato Uetsuka; Tatsuo Teraoka, all of Ibaraki; Satoshi Aoki; Yasunori Iwafuji, both of Kanagawa, all of Japan

[73] Assignees: Hitachi Ltd.; Hitachi Cable, Ltd.; Nippon Telegraph and Telephone Corporation, all of Tokyo, Japan

[21] Appl. No.: 08/898,473

[22] Filed: Jul. 22, 1997

[30] Foreign Application Priority Data

Jul. 25, 1996 [JP] Japan ........................... 8-196616

[51] Int. Cl.⁶ ..................................................... G02B 6/10
[52] U.S. Cl. ........................................ 385/129; 385/131
[58] Field of Search ................................. 385/128–131, 385/49, 50, 88

[56] References Cited

U.S. PATENT DOCUMENTS

| | | | |
|---|---|---|---|
| 4,637,686 | 1/1987 | Iwamoto et al. | 385/128 |
| 5,719,981 | 2/1998 | Katoh | 385/129 |

FOREIGN PATENT DOCUMENTS 8-7288   1/1996   Japan.

*Primary Examiner*—John D. Lee
*Assistant Examiner*—Juliana K. Kang
*Attorney, Agent, or Firm*—McDermott, Will & Emery

[57] ABSTRACT

An optical waveguide 3 comprises a substrate like a Si substrate having a projection with a flat surface and inclined side surfaces thereon, a buffer layer having a refractive index of $n_0$ formed on lower surfaces of the substrate, a secondary buffer layer having a refractive index of $n_0$ formed on the buffer layer, a core waveguide having a refractive index of $n_1$ formed on the secondary buffer layer and a cladding layer having a refractive index of $n_0$ covering the core waveguide. The flat surface of the projection 31 is exposed through an opening. The secondary buffer layer controls a transmission loss increase caused by partial thickness differences of the ground buffer layer or scattering by scratches or strains created by the grind.

17 Claims, 6 Drawing Sheets

10 Si SUBSTRATE

17 CORE WAVEGUIDE

12 FLAT SURFACE
11 PROJECTION

18 CLADDING LAYER

13 SiO₂ GLASS LAYER

19 OPENING
1 OPTICAL WAVEGUIDE

14 BUFFER LAYER

16 CORE GLASS LAYER

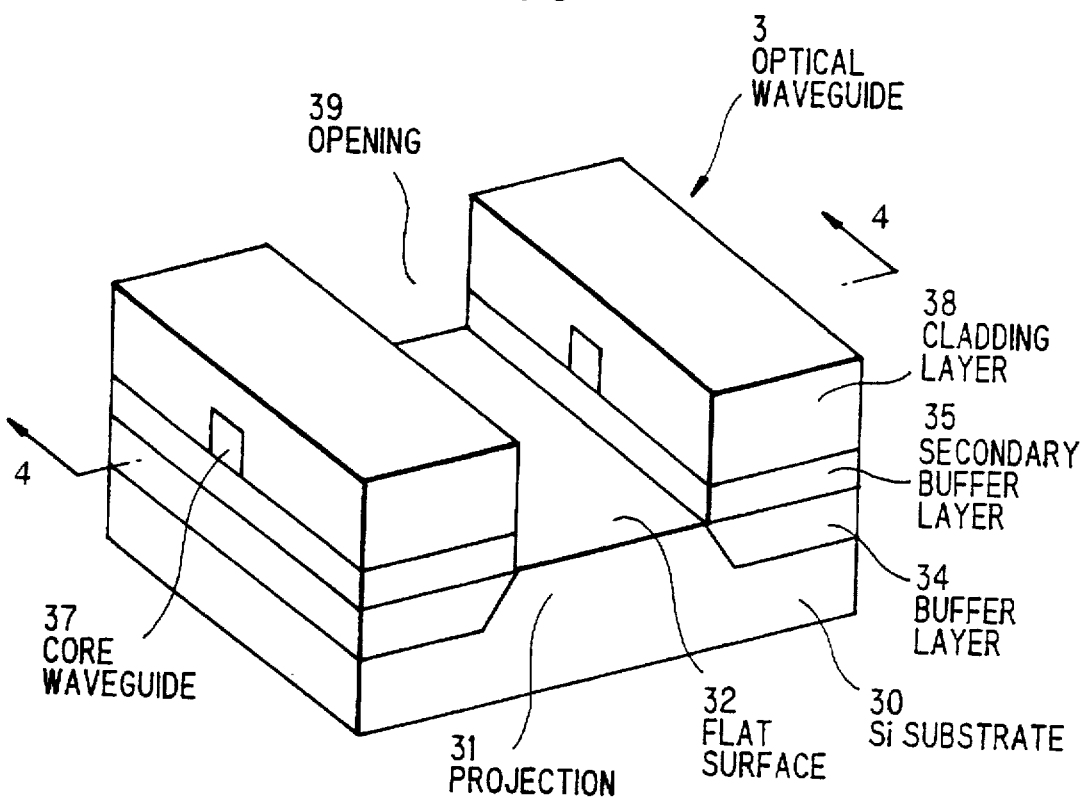

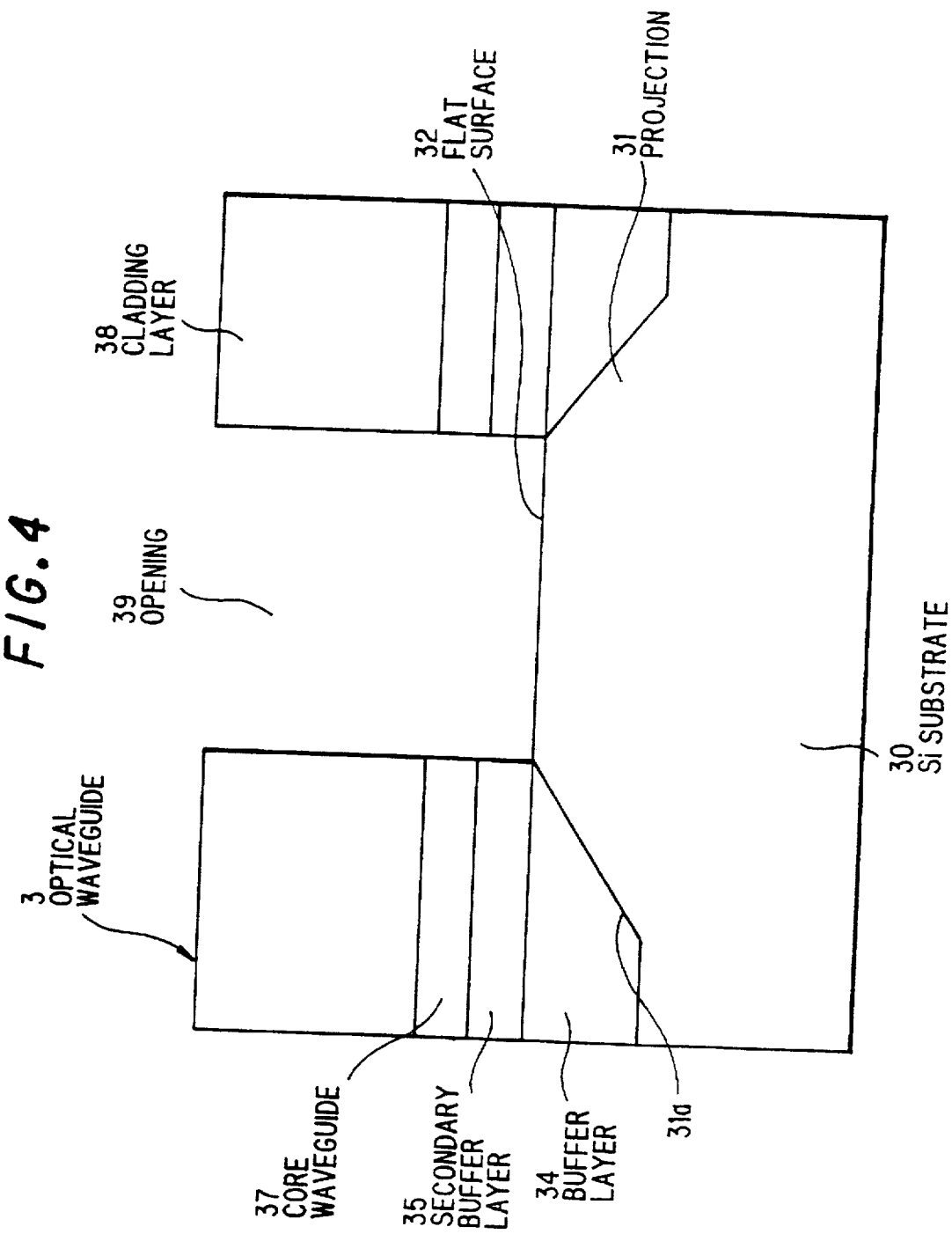

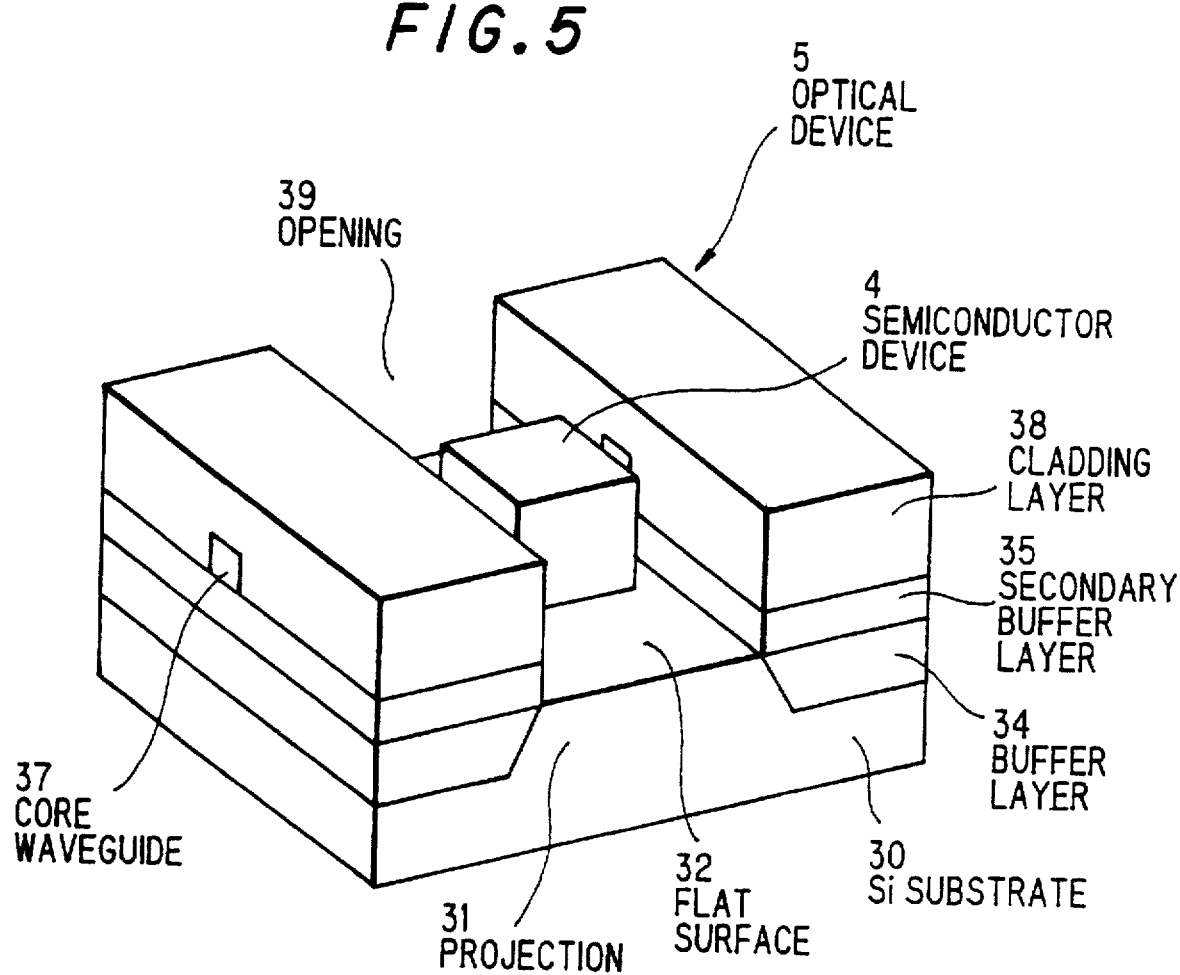

OPTICAL WAVEGUIDE, METHOD OF MAKING THE SAME AND INTEGRATED OPTICAL DEVICE

FIELD OF THE INVENTION

This invention relates to an optical waveguide, a method of making the same and an optical device, and more particularly to, an optical waveguide having an opening through which a surface of projection formed on a substrate thereof is exposed to mount an semiconductor optical chip such as a semiconductor light source and a semiconductor light detector thereon, a method of making the same and an integrated optical device using the same.

BACK GROUND OF THE INVENTION

Nowadays, a semiconductor optical chip, such as a semiconductor light source and a semiconductor light detector, has been extensively used in various optical communication field, and it may have been integrated with a silica glass optical waveguide on a single silicon substrate to provide an integrated optical device. For this purpose, an optical waveguide having an opening through which an upper surface of a substrate thereof is selectively exposed to mount a semiconductor optical chip thereon has been proposed and used.

FIG. 1 shows a conventional optical waveguide 1, which comprises a substrate 10 like a Si substrate having a projection 11 with a flat surface 12 (so called "Si bench") and inclined side surfaces 11a thereon, a buffer layer 14 having a refractive index of $n_0$ formed on the substrate 10, a core waveguide 17 having a refractive index of $n_1$ formed on the buffer layer 14 and a cladding layer 18 having a refractive index of $n_0$ covering the core waveguide 17, wherein the flat surface 12 of the projection 11 is exposed through an opening 19. A semiconductor optical chip (not shown) is later mounted on the flat surface 12 of the projection 11 through the opening 19 to provide an integrated optical device.

A conventional method of making an optical waveguide like this will be explained in FIG. 2.

First of all, a silicon dioxide ($SiO_2$) layer (not shown) is formed on both sides of a silicon substrate 10 (FIG. 2A). The silicon dioxide layer (not shown) on one side of the silicon substrate is selectively etched by both photolithograph and reactive ion etching (RIE), or hydrogen fluoride etching, to form a patterned silicon dioxide layer (not shown). By using the patterned silicon dioxide layer as a mask, the silicon substrate is selectively etched by a potassium hydroxide aqueous solution to form a projection 11 having a flat surface 12 on one side of the silicon substrate 10 (FIG. 2B). Next, a silicon dioxide ($SiO_2$) glass layer 13 is deposited on the silicon substrate 10 in such a way that it covers the flat surface 12 of the projection 11 (FIG. 2C), then the silicon dioxide glass layer 13 is ground to exposed the flat surface 12 of the projection 11 and to form a buffer layer 14 simultaneously, the surface of which is identical with the flat surface 12 of the projection 11 (FIG. 2D). After a core glass layer 16 is deposited by vapor deposition on the surface thus formed (FIG. 2E), a patterned WSi layer (not shown) is formed thereon, then the core glass layer 16 is selectively etched by RIE to form a core waveguide 17 (FIG. 2F). After that, the flat surface of the projection, the surface of the buffer layer and the surfaces of the core waveguide are covered with a porous glass layer by deposition, which is consequently sintered in a furnace to form a transparent cladding layer (FIG. 2G).

Next, an opening of the optical waveguide 1 through which a semiconductor optical chip is to be mounted on the flat surface 12 of the projection 11 will be formed as follows:

First, a metal film (not shown) is formed on the cladding layer 18 and covered with a patterned resist layer (not shown). Then, the metal film (not shown) is selectively removed to form a mask for the opening. Finally, the cladding layer 18 is selectively etched by RIE to form the opening 19 on the optical waveguide 1.

A semiconductor optical chip, such as a semiconductor light source, a semiconductor light detector or the like, may be mounted on the flat surface of the projection through the opening.

In the conventional optical waveguide, however, there is a disadvantage in that desired optical characteristics of the optical waveguide are not always attained. According to the conventional method, as explained above, the flat surface 12 of the projection 11 is exposed by grinding the silicon dioxide glass layer 13 deposited on the silicon substrate 10. Because the silicon substrate 10 may warp for some reasons, it may be difficult to uniformly grind all over the surface of the silicon dioxide glass layer 13. As a result, the buffer layer 14 thus formed may have thickness differences of more than $\pm 5$ μm and optical characteristics of the optical waveguide 1 may be deteriorated. Especially, if the thickness of the buffer layer 14 is smaller than a desired value, the characteristics of the optical waveguide are strongly deteriorated.

To overcome this disadvantages, by taking the partial thickness differences of a buffer layer through grinding into account, an optical waveguide having a relatively thicker buffer layer may be proposed. In this case, however, a transmission loss thereof becomes 0.2 ~0.5 dB/cm, which is about from twice to ten times higher than an usual transmission loss. It is considered that the cause of such a high transmission loss is that scratches or strains due to the grind remain on the back side of the core waveguide, because the core waveguide is formed on the ground surface of the buffer layer.

SUMMARY OF THE INVENTION

Accordingly, it is an object of the invention to provide an optical waveguide having an opening through which an upper surface of a substrate thereof is selectively exposed, optical characteristics of which such as a transmission loss are improved.

It is a further object of the invention to provide an optical waveguide having a buffer layer on a substrate, a core waveguide of which is isolated from the ground surface of the buffer layer.

It is a still further object of the invention to provide a method of manufacturing an optical waveguide of such kind.

It is a still further object of the invention to provide an optical device integrated with such an optical waveguide.

According to the first feature of the invention, an optical waveguide, comprises:

a substrate having a projection thereon;

a buffer layer having a refractive index of $n_0$ formed on the substrate;

a secondary buffer layer having a refractive index of $n_0$ formed on the buffer layer;a core waveguide having a refractive index of $n_1$ formed on the secondary buffer layer; and a cladding layer having a refractive index of $n_0$ covering the core waveguide;

wherein a surface of the projection is exposed through an opening formed in the secondary buffer layer and the cladding layer.

According to the second feature of the invention, a method of manufacturing an optical waveguide, the optical waveguide being provided with an opening through which a surface of a projection formed on a substrate thereof is exposed, the method comprises the steps of:

forming a buffer layer having a refractive index of $n_0$ on a substrate, the substrate having a projection on a surface thereof; exposing the the surface of the projection from the buffer layer; forming a secondary buffer layer having a refractive index of $n_0$ on the buffer layer and the projection;

forming a core waveguide having a refractive index of $n_1$ on the secondary buffer layer;covering the core waveguide with a cladding layer having a refractive index of $n_0$; and selectively removing the cladding layer and the secondary buffer layer to form an opening through which the surface of the projection is exposed.

According to the third feature of the invention, an optical device, comprises:an optical waveguide which comprises a substrate having a projection thereon; a buffer layer having a refractive index of $n_0$ formed on the substrate; a secondary buffer layer having a refractive index of $n_0$ formed on the buffer layer; a core waveguide having a refractive index of $n_1$ formed on the secondary buffer layer; and a cladding layer having a refractive index of $n_0$ covering the core waveguide; wherein a surface of the projection is exposed through an opening formed in the secondary buffer layer and the cladding layer; and an semiconductor optical chip mounted on the surface of the projection through the opening.

BRIEF DESCRIPTION OF THE DRAWINGS

The invention will be explained in more detail in conjunction with the appended drawings, wherein:

FIG. 3 is a perspective view showing an optical waveguide in a preferred embodiment according to the invention, FIG. 4 is a cross-sectional view taken along the line 4—4 in FIG. 3, FIG. 5 is a perspective view showing an optical device using the optical waveguide in the preferred embodiment.

DESCRIPTION OF THE PREFERRED EMBODIMENTS

Figure 1:
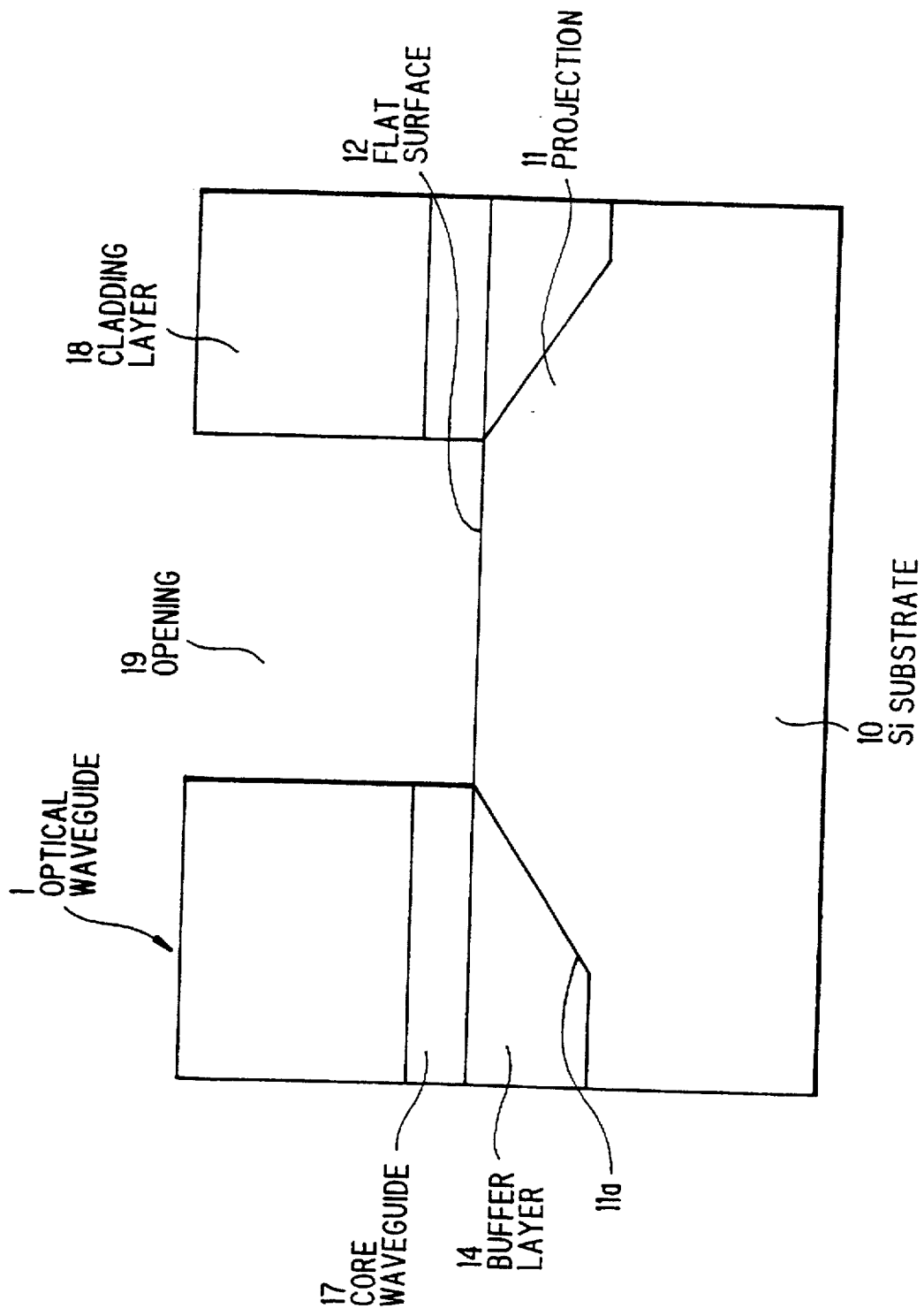
FIG. 1 is a cross-sectional view showing a conventional optical waveguide.
Figure 2A:
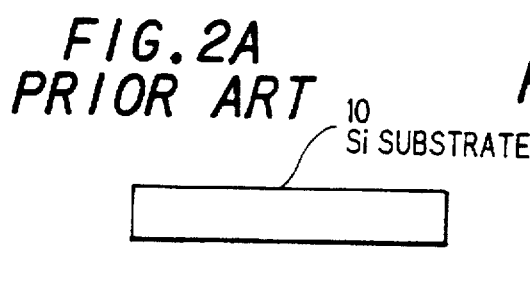
FIGS. 2A–2H show a process flow diagram for making the conventional optical waveguide.
Figure 2F:
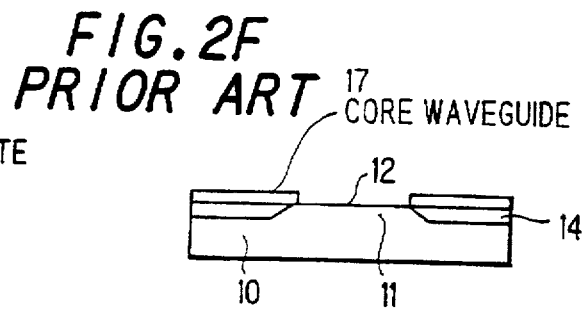
Figure 2B:
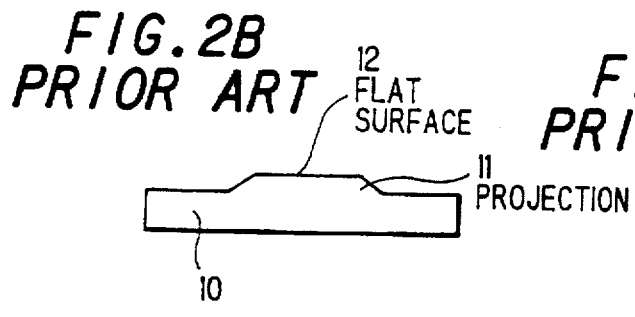
Figure 2G:
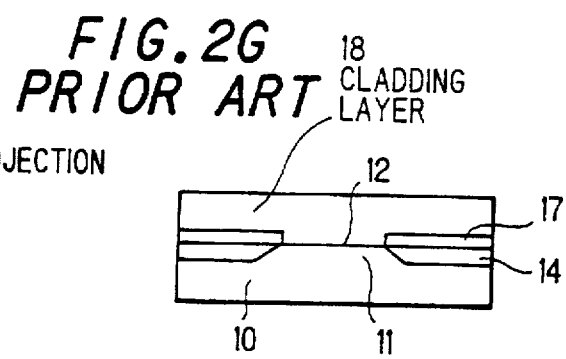
Figure 2C:
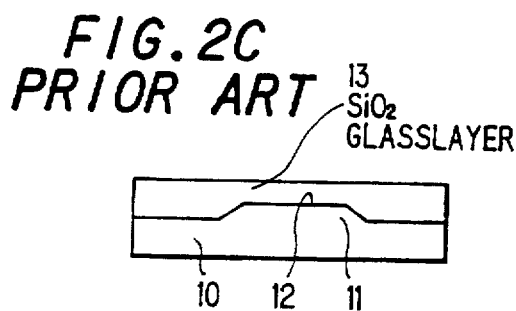
Figure 2H:
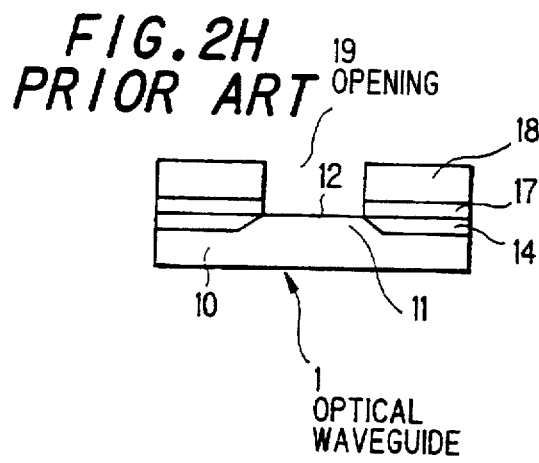
Figure 2D:
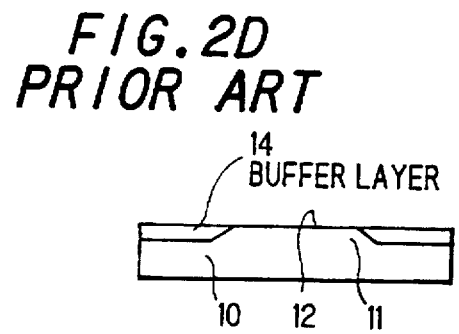
Figure 2E:
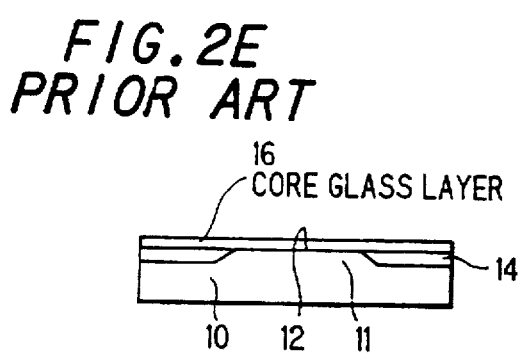

Reference is now made to FIGS. 3 and 4 showing an optical waveguide in a preferred embodiment according to the invention. The optical waveguide 3 comprises a substrate 30 like a Si substrate having a projection 31 with a flat surface 32 ("Si bench") and inclined side surfaces 31a thereon, a buffer layer 34 having a refractive index of $n_0$ formed on lower surfaces of the substrate 30, a secondary buffer layer 35 having a refractive index of $n_0$ formed on the buffer layer 34, a core waveguide 37 having a refractive index of $n_0$ formed on the secondary buffer layer 35 and a cladding layer 38 having a refractive index of $n_0$ covering the core waveguide 37, wherein the flat surface 32 of the projection 31 is exposed through an opening 39.

For practical use, as shown in FIG. 5, a semiconductor optical chip 4 is later mounted on the flat surface 32 of the projection 31 through the opening 39 to provide an integrated optical device 5.

In the preferred embodiment, the material of the secondary buffer layer may comprise doped silica glass or may consist essentially of pure silica glass.

According to the preferred embodiment in accordance with the invention, the secondary buffer layer, which is positioned between the buffer layer and the core waveguide and has the same refractive index as the buffer layer and the cladding layer, controls an increase of transmission loss due to partial thickness differences of the buffer layer or scratches or strains on the surface thereof.

A method of making an optical waveguide in the preferred embodiment will be explained in FIG. 5.

Figure 6A:
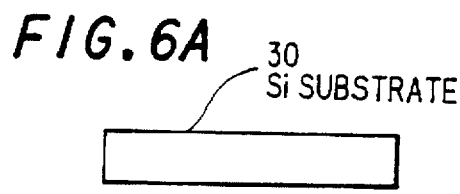
FIGS. 6A–6I show a process flow diagram for making the optical waveguide in the preferred embodiment.
Figure 6B:
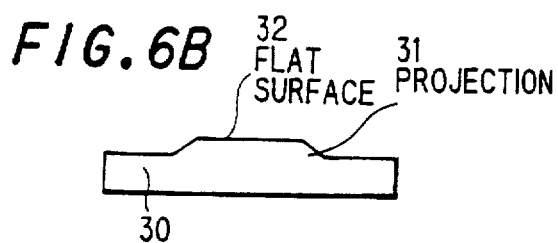

First of all, a silicon substrate having a diameter R of 3 inches and thickness L of 1 mm is prepared. A silicon dioxide ($SiO_2$) layer (not shown) of 1 μm is formed on both sides of the silicon substrate 30 (FIG. 6A). Then, a resist layer (not shown) is formed on one of the silicon dioxide layer (not shown) and exposed with a mask-aligning apparatus to form a patterned resist layer (not shown). The silicon dioxide layer (not shown) on one side of the silicon substrate is selectively etched by reactive ion etching (RIE) or hydrogen fluoride etching to form a patterned silicon dioxide layer (not shown). By using the patterned silicon dioxide layer (not shown) as a mask, the silicon substrate 30 is selectively etched with a potassium hydroxide (KOH) aqueous solution (the concentration thereof is 40 weight % and the temperature thereof is 40° C.) in a depth of 15 μm to form a projection 31 having a flat surface 32 and inclined sides 31a on one side of the silicon substrate 30 (FIG. 6B). The projection 31 has a cross-sectional shape of trapezoid.

Figure 6C:
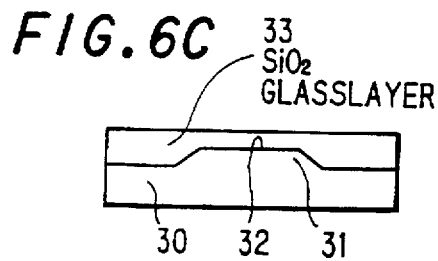
Figure 6D:
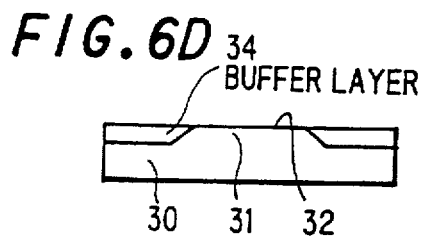
Figure 6E:
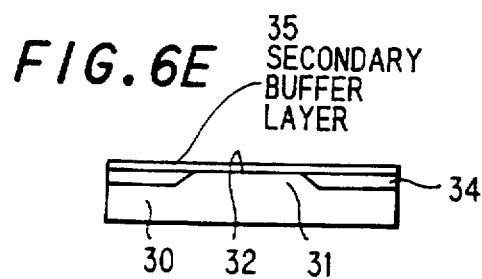

Next, a silicon dioxide ($SiO_2$) glass layer 33 having a refractive index of $n_0$ and thickness of 15 μm is deposited on the silicon substrate 30 by an electron beam deposition process in such a way that it covers the flat surface 32 of the projection 31 (FIG. 6C), then the silicon dioxide glass layer 33 is ground to exposed the flat surface 32 of the projection 31 and to form a buffer layer 34 simultaneously, the surface of which is identical with the flat surface 32 of the projection 31 (FIG. 6D). After that, a pure silicon dioxide glass layer having a refractive index of $n_0$ is deposited on the buffer layer 34 by an electronic beam deposition process to form a secondary buffer layer 35 of 7 μm thick (FIG. 6E).

Figure 6F:
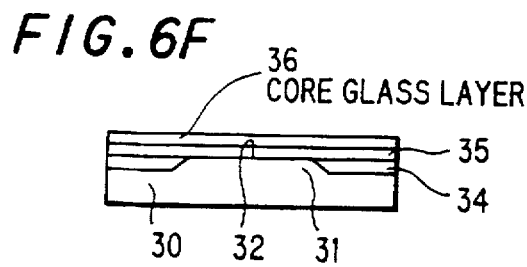
Figure 6G:
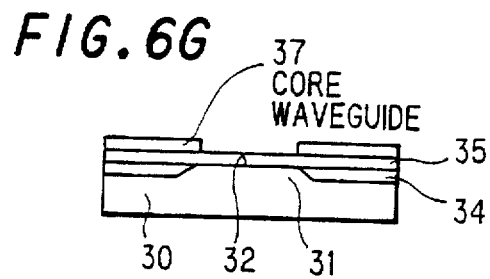

Next, a core glass layer 36 is deposited on the surface of the secondary buffer layer 35 thus formed by an electronic beam deposition process (FIG. 6F). Then, a WSi layer of 1 μm (not shown) is formed on the core glass layer 36 by a magnetron-sputtering process. A resist layer (not shown) is formed thereon and exposed with a mask-aligner (not shown) to form a patterned WSi layer (not shown). Then, the core glass layer 36 is selectively etched by RIE to form a core waveguide 37 (FIG. 6G). In this case, the core glass layer 36 on the flat surface 32 of the projection 31 is totally removed and no core waveguide is formed thereon.

Figure 6H:
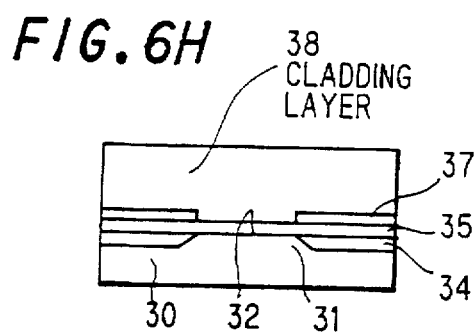
Figure 6I:
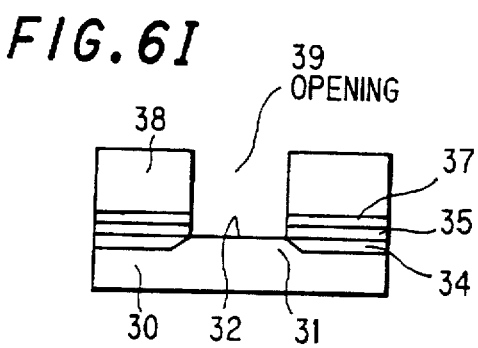

Next, the substrate 30 having the buffer layer 34, the secondary buffer layer 35 and the core waveguide 37 thus formed is place on a heated turntable (not shown) in a deposition apparatus (not shown) and a porous glass layer of 300 μm (not shown) is deposited by a flame deposition process. The porous glass layer (not shown) is heated in a furnace with He atmosphere at 1330° C. for 1 hour and sintered to form a transparent cladding layer 38 having a refractive index of $n_0$ and thickness of 30 μm (FIG. 6H).

Next, a metal film (not shown) is formed on the cladding layer 38 and covered with a patterned resist layer (not shown). Then, the metal film (not shown) is selectively removed to form a mask for the opening. Finally, the cladding layer 38 and the secondary cladding layer 35 are selectively etched by RIE, successively, to form an opening 39 on the optical waveguide 3.

A semiconductor optical chip, such as a semiconductor light source, a semiconductor light detector or the like, may be mounted on the flat surface 32 of the projection 31 through the opening 39.

Transmission losses of the optical waveguide in the preferred embodiment are evaluated. The losses for wave length bands of 1.3 µm and 1.5 µm are 0.1 dB/cm, respectively, and proved to be relatively low.

According to the preferred embodiment, the secondary buffer layer controls a transmission loss increase caused by partial thickness differences of the ground buffer layer or scattering by scratches or strains created by the grind.

In the invention, the thickness of the secondary buffer layer is preferably 0.1 µm ~10 µm for a lower transmission loss. A optical waveguide which is made in the similar way to that in the preferred embodiment but has a secondary buffer layer of 0.1 µm is evaluated and the transmission loss thereof is 0.2 dB/cm. Moreover, an optical waveguide which is similarly made but has a secondary buffer layer of 10 µm shows a transmission loss of 0.1 dB/cm.

In the invention, a silica glass layer may be formed by another process other than an electron beam deposition process and a flame deposition process. Moreover, besides a patterned metal film or a silicon dioxide layer, other resist materials as an etching mask for forming a projection, a core waveguide, an opening or the like may be used. Besides RIE, other process such as a dry-etching process may be used.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An optical waveguide, comprising:
    a substrate having a projection thereon;
    a buffer layer having a refractive index of $n_0$ formed on said substrate;
    a secondary buffer layer having a refractive index of $n_0$ formed on said buffer layer; a core waveguide having a refractive index of $n_1$ formed on said secondary buffer layer; and
    a cladding layer having a refractive index of $n_0$ covering said core waveguide;
    wherein a surface of said projection is exposed through an opening formed in said secondary buffer layer and said cladding layer.

2. An optical waveguide, according to claim 1, wherein: said substrate is a silicon substrate.

3. An optical waveguide, according to claim 2, wherein: said buffer layer, said secondary buffer layer, said core waveguide and said cladding layer are made of silica glass.

4. An optical waveguide, according to claim 3, wherein: said secondary buffer layer consists essentially of pure silica glass.

5. An optical waveguide, according to claim 1, wherein: said secondary buffer layer has a thickness of 0.1 µm~10 µm.

6. An optical waveguide, according to claim 1, wherein: said buffer layer has a ground surface on which said secondary buffer layer is formed.

7. A method of manufacturing an optical waveguide formed on a substrate having a projection, said optical waveguide comprising a buffer layer, a secondary buffer layer, a core waveguide and a cladding layer, with said secondary buffer layer, said core waveguide and said cladding layer being removed on said projection of said substrate to expose said projection of said substrate, said method comprising the steps of:
    forming said buffer layer having a refractive index of $n_0$ on said substrate;
    selectively removing said buffer layer on said projection of said substrate, exposing said substrate;
    forming said secondary buffer layer having a refractive index of $n_0$ on said buffer layer and said projection of said substrate;
    forming a core glass layer having a refractive index of $n_1$ on said secondary buffer layer;
    selectively removing said core glass layer indirectly on said projection of said substrate to form said core waveguide indirectly on said buffer layer;
    covering said core waveguide with said cladding layer having a refractive index of $n_0$; and
    selectively removing said cladding layer and said secondary buffer layer on said projection of said substrate, exposing said substrate.

8. A method of manufacturing an optical waveguide, according to claim 7, wherein: said substrate is a silicon substrate.

9. A method of manufacturing an optical waveguide, according to claim 8, wherein: said buffer layer, said secondary buffer layer, said core waveguide and said cladding layer are made of silica glass.

10. A method of manufacturing an optical waveguide, according to claim 9, wherein: said secondary buffer layer consists essentially of pure silica glass.

11. A method of manufacturing an optical waveguide, according to claim 7, wherein: said secondary buffer layer has a thickness of 0.1 µm~10 µm.

12. An optical device, comprising:
    an optical waveguide which comprises a substrate having a projection thereon; a buffer layer having a refractive index of $n_0$ formed on said substrate; a secondary buffer layer having a refractive index of $n_0$ formed on said buffer layer; a core waveguide having a refractive index of $n_1$ formed on said secondary buffer layer; and a cladding layer having a refractive index of $n_0$ covering said core waveguide; wherein a surface of said projection is exposed through an opening formed in said secondary buffer layer and said cladding layer; and
    an semiconductor optical chip mounted on the surface of said projection through said opening.

13. An optical device, according to claim 12, wherein: said substrate is a silicon substrate.

14. An optical device, according to claim 13, wherein: said buffer layer, said secondary buffer layer, said core waveguide and said cladding layer are made of silica glass.

15. An optical device, according to claim 14, wherein: said secondary buffer layer consists essentially of pure silica glass.

16. An optical device, according to claim 12, wherein: said secondary buffer layer has a thickness of 0.1 µm~10 µm.

17. An optical device, according to claim 12, wherein: said buffer layer has a ground surface on which said secondary buffer layer is formed.

* * * * *